W. J. SANDERS.
PIPE CUTTER.
APPLICATION FILED MAR. 25, 1922.

1,428,712.

Patented Sept. 12, 1922.

Inventor:
Walter J. Sanders
By Cheever & Cox
Attys.

W. J. SANDERS.
PIPE CUTTER.
APPLICATION FILED MAR. 25, 1922.

1,428,712.

Patented Sept. 12, 1922.
2 SHEETS—SHEET 2.

Inventor:
Walter J. Sanders
By Cheever + Cox
Attys.

Patented Sept. 12, 1922.

1,428,712

UNITED STATES PATENT OFFICE.

WALTER J. SANDERS, OF CHICAGO, ILLINOIS, ASSIGNOR OF ONE-HALF TO JOHN H. SANDERS, OF CHICAGO, ILLINOIS.

PIPE CUTTER.

Application filed March 25, 1922. Serial No. 546,603.

*To all whom it may concern:*

Be it known that I, WALTER J. SANDERS, a citizen of the United States, residing at Chicago, in the county of Cook and State of Illinois, have invented a certain new and useful Improvement in Pipe Cutters, of which the following is a specification.

This invention relates to pipe cutters of the type shown in my prior Patent No. 1,402,968, dated January 10, 1922, in which a chain or the like provided with cutting tools such as wheels, is placed about the circumference of a rigid pipe placed in the corner of a room or the like and then rocked through a comparatively short angle to sever the pipe in a circular cut on its circumference.

Pipe cutters of this class all use a cutting chain made up of links of substantially equal length pivoted end to end on the axes of equally spaced cutting wheels. When such a chain is placed on the surface of the pipe and moves circumferentially over the face thereof a distance equal to the distance between two wheels, those two wheels will completely cut that part of the surface of the pipe which was between the wheels when the movement started. From this it follows that if a chain could be placed around the circumference of the pipe with all of the wheels equally spaced, it would only be necessary to rock or reciprocate the chain an angular distance equal to the distance between two given wheels to make a complete severance of the pipe. The difficulty with pipe cutters of this class, and particularly with that of said prior patent is that the frame mechanism which supports the cutting chain necessarily prevents the wheels in the regular chain immediately adjacent to the frame being brought as close together as the normal wheel separation distance of the wheel parts of the chain, consequently in order to make a complete pipe severance with a device of this kind, the operator must rock the entire mechanism through an arc which is equal to the distance between said two wheels which are nearest to the frame.

The object of this invention is to provide any pipe cutting device having this defect, and particularly that of said prior patent, with a supplemental cutting wheel located adjacent to the frame and between the two wheels of the chain which are nearest to it, whereby the pipe to be cut is, in the operation of the device, attacked by a complete set of wheels and the tool requires a rocking motion not greater than the distance between said supplemental wheel and the nearest wheel of the pipe cutting chain instead of twice that distance, as required in devices of the prior art. The object of the invention also contemplates the proper manipulation of this supplemental wheel to and from the pipe without reference to the wheels of the chain and the mechanism which controls them.

The invention consists in means for attaining the foregoing objects, which can be easily and cheaply made, which is satisfactory in use and is not readily liable to get out of order. More particularly, the invention consists in many features and details of construction which will be hereafter more fully set forth in the specification and claims.

Referring to the drawings, in which like numerals indicate the same parts throughout the several views—

Figure 1 is an end view;

Figure 2 a face view of mechanism of said prior patent improved by the application of this invention thereto;

Figure 1:
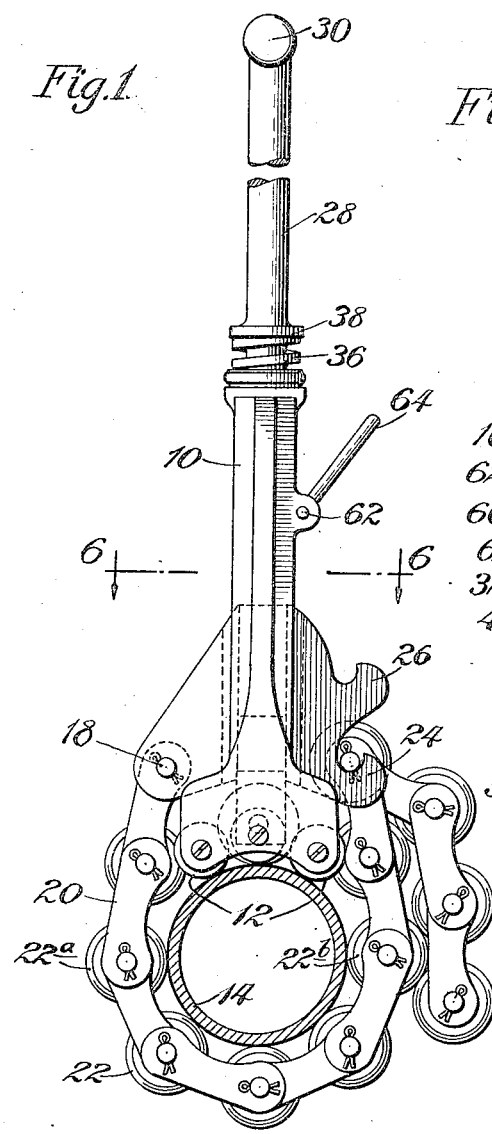

The drawings shown a U-shaped frame 10 carrying at the ends of its arms supporting rollers 12 traveling on the pipe 14 to be cut exactly as in said prior patent. Vertically reciprocable inside this U-shaped member 10 is a crosshead 16 having pivotally attached to one side at 18 a cutting chain 20 having the equally spaced cutting wheels 22 referred to in the opening statement, adapted for application to a pipe 14, as shown, the opposite end portion of the chain being attachable to hooks 24 or 26 on the other side of the crosshead, all as generally shown in said prior patent. Also, in general conforming to said prior patent, the frame 10 is provided with a rotatable shaft 28 having in its outer end an operating handle 30 and in its inner end screw threads 32 engaging the crosshead 16 whereby rotating the handle will reciprocate the crosshead in the U-shaped member 10 in a direction depending upon the direction of rotation of the handle. This shaft 28, which is rotatable in the crosshead 10, is held in non-reciprocable relation thereto by a collar 34 inside the crosshead and by a spring 36 outside it, the upper end of the spring engaging a flange 38 on the shaft 28 and an anti-friction bearing, specifically a ball bearing 40 interposed between the spring and the upper end of the U-shaped member. This spring-anti-friction bearing is new in this application and is provided to take up serious wear which occurs in the use of the device of said prior patent, due to the strain created at this point by the operator's turning up handle 30 to force the wheels 22 into the pipe as he reciprocates the handle 30 circumferentially of the pipe 14. The spring is also of great advantage in allowing a yielding movement at this point between the shaft 28 and the frame so as to allow the wheels 22 to pass over slight irregularities in the surface of the pipe which are most frequently present at the beginning of the cutting operation on the surface of the pipe. Except as just noted, the parts thus far described are substantially the same as those in the prior patent and operate in the same manner.

On examining Figure 1, the reader will observe that the wheels 22$^a$ and 22$^b$ are the last wheels of the group of wheels 22 of chain 20 passing about the lower half of pipe 14 which contact the pipe, from which it follows that without the assistance of the invention which is to be hereafter described, the operator would have to rock the entire mechanism through 180 degrees in order to cause this group of wheels to travel completely around the pipe and thus completely sever it. In order to reduce the length of the required arc of rock for the wheels to produce this result, a supplemental cutting wheel 42 is provided midway between wheels 22$^a$ and 22$^b$ and immediately adjacent to the general frame of the tool, specifically the U-shaped member 10. This wheel 42 is journaled in a second crosshead 44 reciprocatable vertically inside the U-shaped member 10 on suitable guiding devices; in the particular case here illustrated both crossheads 16 and 44 are adapted for vertical movement along the same set of guides 46 provided on the inside of the U-shaped member 10. The lower crosshead 44 is sustained by two vertical screws 48 which pass loosely through tubular passages 50 provided for them in the first crosshead 16. The lower ends of these screws 48 are rotatably but non-reciprocatably mounted in the lower crosshead 44 by any suitable means, as for instance the ball joints 52. These screws 48, after passing through the crosshead 16, have their upper ends rotatably and non-reciprocatably mounted in the U-shaped member 10 through collars 54 attached thereto placed in slots 56 in member 10, as shown in Figures 2 and 5.

Figure 2:
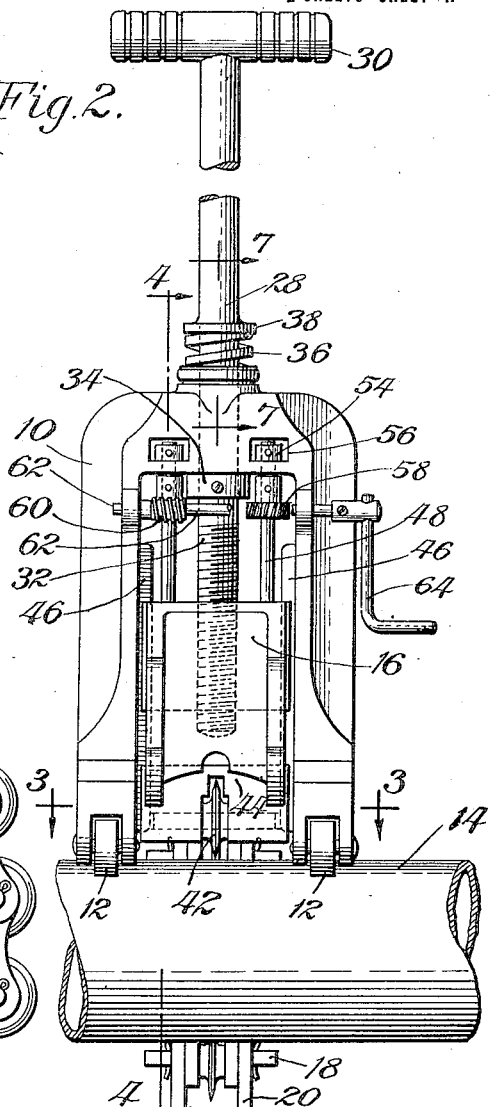
Figure 3:
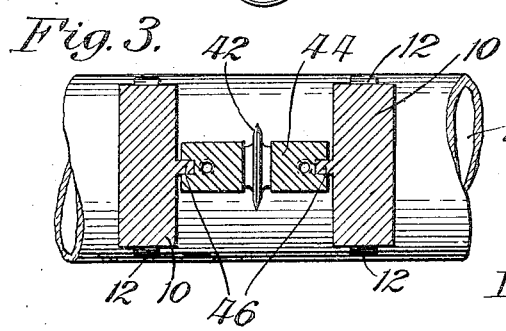
Figure 3 is a detail plan view on the line 3—3 of Figure 2.
Figure 4:
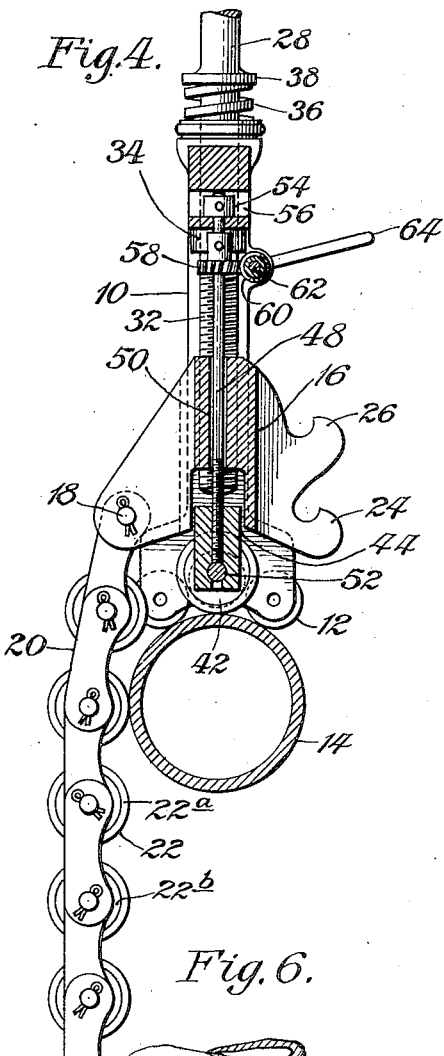
Figure 4 is a sectional detail side view on the line 4—4 of Figure 2.

In the preferred embodiment of the invention shown in Figure 2, these shafts 48 are rotatable in unison by virtue of the fact that each one carries a worm wheel 58 which is engaged by a worm 60 on a shaft 62 rotatable by any suitable means, as for instance a handle 64.

Figure 5:
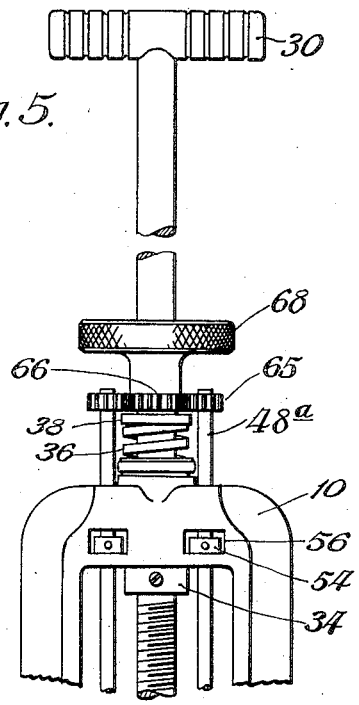
Figure 5 is an enlarged detail of an alternative form of wheel adjusting device.
Figure 6:
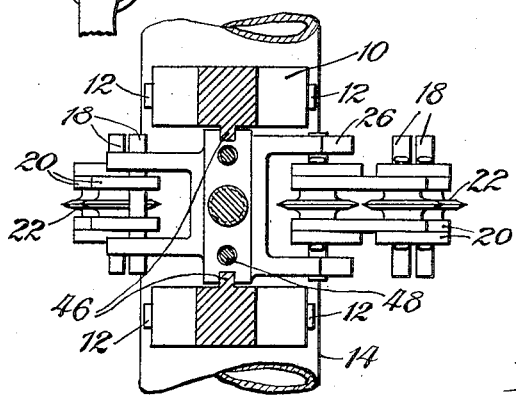
Figure 6 is a detail plan view on the line 6—6 of Figure 1.
Figure 7:
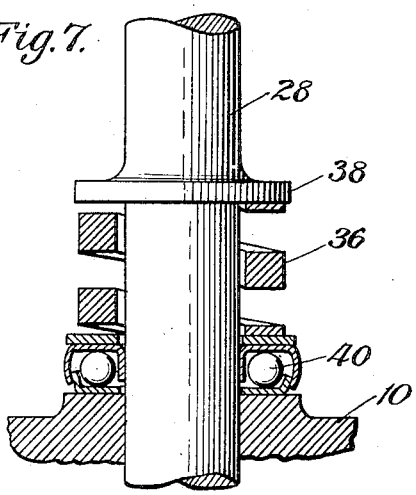
Figure 7 is a sectional detail view on the line 7—7 of Figure 2.

In the modified form of the invention shown in Figure 5, the shafts 48 are extended upwardly entirely through the U-shaped member 10 and have on their upper extended ends 48$^a$ pinions 65 which mesh with gear 66 driven by hand wheel 68 readily manipulatable by the operator.

In the operation of the device, the operator rotates handle 30 to draw crosshead 16 upward, and thus force the cutting chain wheels 22 against the surface of pipe 14, and either independently or simultaneously he rocks the handle 30 and shaft 28 circumferentially of the pipe, thus causing cutting action by these wheels, all as fully set forth in the prior patent. While proceeding as just described, he manipulates either handle 64 or wheel 68, depending on which construction is present in the device he is using, to in the obvious manner rotate the shafts 48 to force crosshead 44 downward, and thus drive wheel 42 into the surface of the pipe. By properly adjusting the two crossheads in the manner just described, the wheel 42 and this group of wheels 22 will properly simultaneously engage the pipe and by making a 90 degree rocking of the lever 28, complete severance of the pipe may be obtained.

The drawings show the device applied to a rather small pipe. When a larger pipe is to be cut, more of the chain wheels 22 on the sides of the U-shaped frame will attack the circumference of the pipe, with the result that the distance between the wheels 22$^a$ and 22$^b$ nearest to the frame will be less than 180 degrees and consequently the half of that distance required for rocking produced by applying wheel 42 to the pipe will be materially reduced, so that in the case of very large pipe, the invention produces a device which will sever a pipe on being rocked through a very short distance.

What I claim is:

1. In mechanism of the class described, a U-shaped frame member having oppositely disposed side members lying in a plane through the axis of the pipe to be cut, a plurality of wheels on the end of each such side members adapted to travel in the arc of a circle about a pipe to be cut, a crosshead reciprocatable in the U-shaped member, a pipe cutting chain connected to the crosshead between said pluralities of wheels passing around the pipe, means for moving the crosshead, to tighten the chain, a second crosshead reciprocatable in the U-shaped member located outside the first crosshead adjacent to the pipe to be cut, a pipe cutting instrument on the second crosshead and slow motion means for moving the second crosshead toward or from a pipe to be cut, and means for moving the U-shaped member and all parts carried thereby about the pipe, for the purposes set forth.

2. In mechanism of the class described, a plurality of supporting wheels in alignment with each other in a plane transverse to the axis of a pipe to be cut and adapted to travel around the circumference of such a pipe, another similar set of wheels parallel thereto, a U-shaped body member having two arms, lying in the plane of the axis of the pipe to be cut, one of which affords journal support for each of said sets of wheels, a crosshead intermediate of said sets of wheels reciprocatable with reference to the body member, means to so reciprocate the crosshead, a chain carrying pipe cutting member, attached to the crosshead and embracing the pipe to be cut, intermediate of the first sets of wheels, a second crosshead reciprocatable in the U-shaped member located outside the first crosshead adjacent to the pipe to be cut, a pipe cutting instrument on the second crosshead and slow motion means for moving the second crosshead toward or from a pipe to be cut, all of the parts being arranged and disposed as shown and described, for the purposes set forth.

3. In mechanism of the class described, a U-shaped frame member having oppositely disposed side members lying in a plane through the axis of the pipe to be cut, a plurality of wheels on the end of each such side members adapted to travel in the arc of a circle about a pipe to be cut, a crosshead reciprocatable in the U-shaped member, a pipe cutting chain connected to the crosshead between said pluralities of wheels passing around the pipe, means for moving the crosshead to tighten the chain, a second crosshead reciprocatable in the U-shaped member located outside the first crosshead adjacent to the pipe to be cut, a pipe cutting instrument on the second crosshead, a pair of screws attached to the second crosshead extending loosely through the first crosshead, nonreciprocably mounted in the U-shaped member and a slow motion device for rotating said screws to move the second crosshead with reference to the U-member independently of the first crosshead.

In witness whereof, I have hereunto subscribed my name.

WALTER J. SANDERS.